United States Patent [19]
Kuboji et al.

[11] Patent Number: 5,913,009
[45] Date of Patent: Jun. 15, 1999

[54] CHARACTER DISPLAY CONTROL APPARATUS

[75] Inventors: Genichiro Kuboji, Chiba; Satoshi Iino, Tokyo, both of Japan

[73] Assignee: Sony Corporation, Tokyo, Japan

[21] Appl. No.: 08/537,280

[22] Filed: Sep. 29, 1995

[30]    Foreign Application Priority Data

Oct. 5, 1994    [JP]    Japan ................................. 6-240921

[51] Int. Cl.⁶ .................................................... H04N 5/91
[52] U.S. Cl. .............................. 386/68; 386/8; 348/468; 348/563; 348/589
[58] Field of Search ................................ 386/68, 81–83, 386/95, 6–8; 348/468, 589, 564–565, 563, 476–479, 473, 460, 423, 845.2; H04N 5/91

[56]                References Cited

U.S. PATENT DOCUMENTS

| | | | |
|---|---|---|---|
| 5,285,265 | 2/1994 | Choi ........................................... | 386/83 |
| 5,457,542 | 10/1995 | Kim ............................................ | 386/8 |
| 5,473,481 | 12/1995 | Min ............................................ | 386/95 |
| 5,510,849 | 4/1996 | Han ........................................... | 386/95 |
| 5,572,260 | 11/1996 | Onishi et al. ............................. | 348/460 |
| 5,579,057 | 11/1996 | Banker et al. ............................ | 348/589 |
| 5,627,691 | 5/1997 | Hong .......................................... | 386/95 |
| 5,768,467 | 6/1998 | Kuboji et al. .............................. | 386/68 |

*Primary Examiner*—Wendy Garber
*Assistant Examiner*—Vincent F. Boccio
*Attorney, Agent, or Firm*—Jay H. Maioli

[57]                ABSTRACT

A character display control apparatus by which only a display of characters can be put into a pause condition without putting a display of an image into a pause condition operates so that when a caption pause is instructed, a CPU controls a screen display circuit and character signals are stored in and read out from a memory. The operation is continued, and the CPU controls a monitor to continue displaying of characters being displayed then as it is until the caption pause is canceled. In this instance, a video signal processing circuit is not put into a pause condition, and when the image of the video signal supplied thereto from an external input terminal varies, the image displayed on the monitor successively varies as time passes. When cancellation of the caption pause is instructed, the CPU controls the screen display circuit so that, when new character data are inputted, they are supplied to the memory so that they are stored in place of the character data stored till then.

7 Claims, 9 Drawing Sheets

CHARACTER DISPLAY CONTROL APPARATUS

BACKGROUND OF THE INVENTION

1. Field of the Invention

This invention relates to a character display control apparatus suitable for use with, for example, a closed caption decoder.

2. Description of the Related Art

In a closed caption system, character information is superposed within a vertical fly-back period of a video signal. By decoding the character information using a decoder, predetermined characters can be displayed in a superposed relationship with an image.

For example, when characters of "DO" are superposed within a vertical fly-back period of a first frame and characters "G!" are superposed within a fly-back period of a second frame, if the characters are decoded and displayed, then, for example, such an image as shown in FIG. 14 is obtained. In particular, the characters "DOG!" are displayed in a superposed relationship in addition to an original image.

If such video signal is recorded onto a recording medium such as a video disk or a video tape and then reproduced by slow reproduction, then a same frame (or field) is reproduced a plurality of times. For example, if a frame in which the characters "DO" are recorded is reproduced twice, then since the characters of "DO" overlap with each other, if the character information included in a reproduction signal of the recording medium is decoded and displayed as it is, then the characters of "DODOG!" are displayed as seen in FIG. 15.

Thus, in order to eliminate such a situation as described above, it has been proposed, for example, in Japanese Patent Laid-Open No. Hei 5-308620 to stop, during slow reproduction, decoding of character information included in a video signal inputted at the timing when a same frame is reproduced and outputted for the second time. This allows realization preventing a display as seen in FIG. 15 but not preventing a display as seen in FIG. 14.

If this technique is applied to a pause mode, then by putting a recording medium into a pause condition, spelling of characters can be confirmed accurately spending a sufficient time.

However, with the technique disclosed in the document mentioned above, in order to put a display of characters into a pause condition, a recording medium itself must be put into a pause condition, and in this instance, not only a display of characters but also a display of an image are put into a pause condition. Accordingly, the technique disclosed in the document described above has a subject to be solved in that, for example, if an operation for setting a pause condition for confirmation of characters is repeated while a recording medium is being reproduced to study English conversation, then the studying time is increased excessively long.

Further, a reproduction apparatus having a pause function has another subject to be solved in that a display of characters cannot be put into a pause condition.

SUMMARY OF THE INVENTION

It is an object of the present invention to provide a character display control apparatus by which only a display of characters can be put into a pause condition even when character information is included in a video signal received from an apparatus having no pause function.

In order to attain the object described above, according to an aspect of the present invention, there is provided a character display control apparatus for controlling a displaying condition of a character in a superposed relationship with an image, comprising separation means for separating character data included in a video signal inputted thereto, generation means for generating a character signal corresponding to the character data separated by the separation means, superposition means for superposing the character signal generated by the generation means with an image signal of the video signal, manually operable means for being manually operated in order to put the character display into a pause condition without putting the image display into a pause condition, and control means operable in response to a manual operation of the manually operable means for controlling the generation means to put the character display into a pause condition.

In the character display control apparatus, when the manually operable means is manually operated, the control means controls the generation means to put a display of a character into a pause condition. In this instance, the superposition means is not put into a pause condition. Consequently, while the image display may vary with respect to time, the character display is fixed and does not vary with respect to time. Accordingly, the character display can be put into and kept in a pause condition for a required time without varying the display condition of the image in order to perform confirmation of the character display. Further, a display even of a character which is included in a reproduction video signal from a recording medium reproduction apparatus having no pause function can be put into and kept in a pause condition.

The character display control apparatus may be constructed such that the control means puts, when the manually operable means is manually operated in a condition wherein a character is displayed, the character display into a pause condition, but displays, when the manually operable means is manually operated in a condition wherein no character is displayed, a character to be displayed at a next timing and then put the character display into a pause condition. Thus, a pause condition is set normally in a condition wherein a character is displayed, and consequently, the possibility that it may be mistaken that the apparatus has failed is reduced.

And/or, the character display control apparatus may be constructed such that the manually operable means is manually operated also to cancel a pause condition, and the control means cancels, when the manually operable means is manually operated in a pause condition of a display, the pause condition. Thus, the manually operable means is manually operated not only to set a pause condition but also to cancel such pause condition, and consequently, the operability is improved. Further, the area of the space for provision of the manually operable means can be reduced as much, which facilitates miniaturization of the apparatus.

According to another aspect of the present invention, there is provided a character display control apparatus, comprising means for supplying a video signal including an image signal, an audio signal and character data, a decoder for separating the character data from the video signal, generating a character signal corresponding to the thus separated character data and superposing the character signal and the image signal, means for displaying the thus superposed character signal and image signal, and manually operable means for putting only the display of the character signal into a pause condition.

The character data may be inserted in a vertical fly-back period of the video signal. In this instance, the character data correspond to the audio signal.

The manually operable apparatus may be a remote commander.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
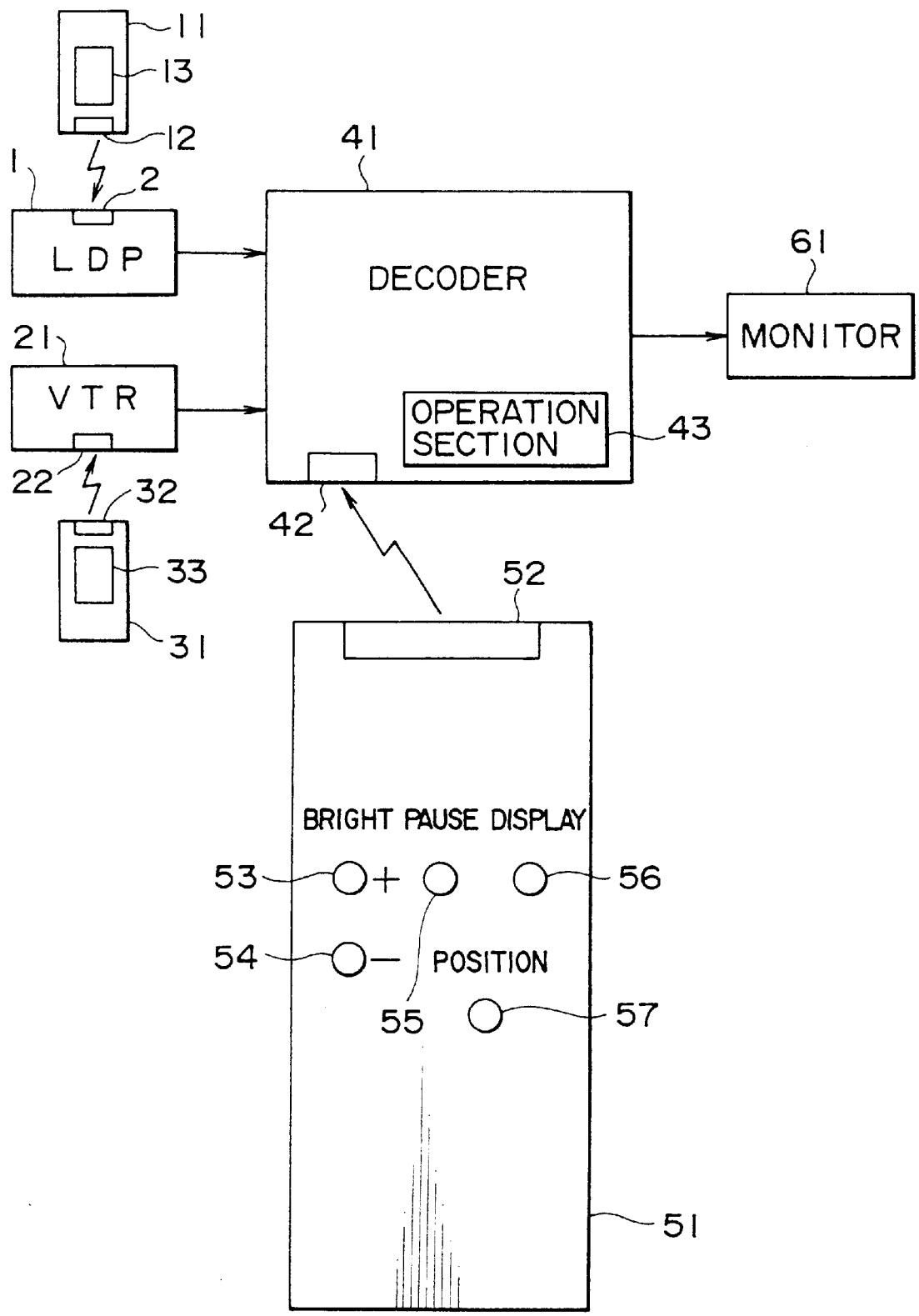
FIG. 1 is a block diagram showing an example of a construction of a closed caption system to which a character display control apparatus of the present invention is applied.

Referring first to FIG. 1, there is shown an example of a construction of a closed caption system to which a character display control apparatus of the present invention is applied. In the closed caption system shown, a laser disk player (LDP) 1 reproduces a video signal recorded on a video disk built therein and outputs the video signal to a decoder 41. When an operation section 13 of a remote commander 11 is manually operated, an infrared ray signal corresponding to the manual operation is outputted from a light emission section 12 and transmitted to a light reception section 2 of the LDP 1.

Similarly, when an operation section 33 of another remote commander 31 is manually operated, then an infrared ray signal corresponding to the manual operation is outputted from a light emission section 32 and supplied to a light reception section 22 of a VTR 21. The VTR 21 performs a predetermined operation in response to a signal received by the light reception section 22. Then, a video signal reproduced from a video tape built in the VTR 21 is outputted to the decoder 41.

A video signal reproduced by and outputted from the LDP 1 or the VTR 21 includes not only an original image but also character information (for example, character codes) superposed on a predetermined horizontal scanning line (for example, on a 21st horizontal scanning line) in a vertical fly-back period thereof. The decoder 41 reads those character codes and outputs them in a superposed relationship with an image signal included in the video signal to a monitor 61 so that they may be displayed on the monitor 61.

Meanwhile, the decoder 41 includes an operation section 43 so that a predetermined instruction can input directly therethrough. The operation section 43 has basically the same construction as the operation section of the remote commander 51 so that it can directly input a same instruction as an instruction which is inputted by manually operating the operation section of the remote commander 51.

The remote commander 51 includes a button 53 which is manually operated to increase the brightness (BRIGHTNESS) of a character display, and another button 54 which is manually operated to decrease the brightness of a character display. The remote commander 51 further includes a caption pause (CAPTION PAUSE) button 55 which is manually operated to put only a character display into a pause condition. A display (DISPLAY) button 56 is manually operated to turn on or off a display of characters. Meanwhile, a position (POSITION) button 57 is manually operated to vary a display position of characters.

When a predetermined button of the remote commander 51 is manually operated, an infrared ray signal corresponding to the manual operation is outputted from a light emission section 52 and supplied to a light reception section 42 of the decoder 41.

Figure 2:
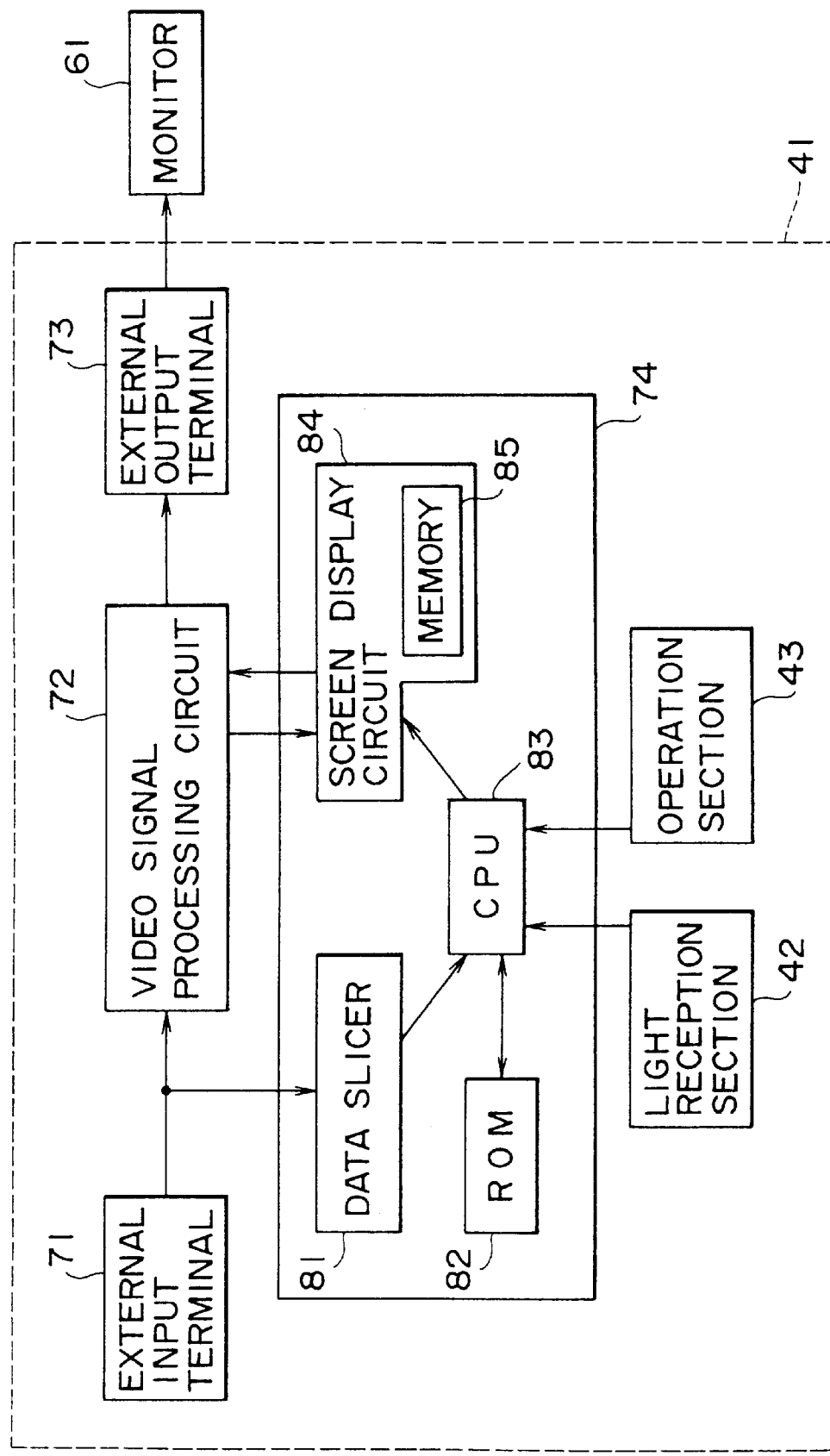
FIG. 2 is a block diagram showing an example of an internal construction of a decoder shown in FIG. 1.

FIG. 2 shows an example of a construction of the decoder 41. A reproduction output from the LDP 1 or the VTR 21 is inputted to an external input terminal 71 by way of an AV signal line not shown. The video signal inputted to the external input terminal 71 is inputted to a video signal processing circuit 72 and a microcomputer 74. The video signal processing circuit 72 processes the video signal inputted thereto and outputs the thus processed video signal to an external output terminal 73. The external output terminal 73 is connected to the monitor 61 by way of an AV signal line so that a predetermined image can be outputted to and displayed on the monitor 61.

A data slicer 81 of the microcomputer 74 separates character codes included in a 21st horizontal scanning line of the video signal inputted thereto from the external input terminal 71 and outputs the thus separated character codes to a CPU (central processing unit) 83. The CPU 83 executes various processing in accordance with a program stored in a ROM (read only memory) 82 and outputs data corresponding to the character codes to a screen display circuit 84. The screen display circuit 84 thus generates character signals corresponding to the character codes. The screen display circuit 84 has a built-in memory 85 so that a predetermined number of character signals are stored into the memory 85.

The screen display circuit 84 counts, with reference to a vertical synchronizing signal supplied thereto from the video signal processing circuit 72, the number of horizontal synchronizing signal inputted thereto since then, and outputs a character signal to the video signal processing circuit 72 so that characters may be displayed on predetermined horizontal scanning lines. The video signal processing circuit 72 superposes the character signal inputted thereto from the screen display circuit 84 with an image signal and outputs the thus superposed signal to the external output terminal 73.

To the CPU 83, a signal corresponding to an infrared ray signal received by the light reception section 42 is inputted. Also a signal corresponding to a manual operation of the operation section 43 is inputted.

Figure 3:
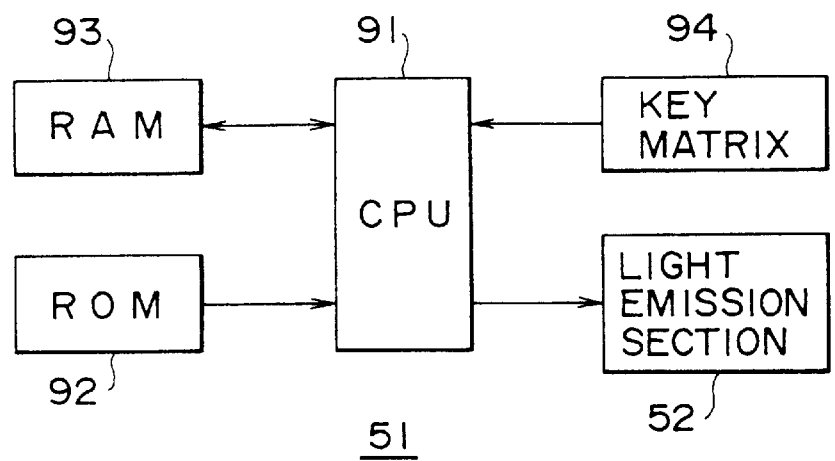
FIG. 3 is a block diagram showing an example of an internal construction of a remote commander shown in FIG. 1.

FIG. 3 shows an example of an internal construction of the remote commander 51. Referring to FIG. 3, a CPU 91 executes various processing in accordance with a program stored in a ROM 92. Data and so forth necessary for the CPU 91 to execute various processing are suitably stored into a RAM (random access memory) 93. A key matrix 94 detects a manual operation of any of various buttons of the remote commander 51 shown in FIG. 1 and outputs a result of the detection to the CPU 91. The light emission section 52 is controlled by the CPU 91 and outputs an infrared ray signal corresponding to the button detected by the key matrix 94.

Subsequently, operation of the character display control apparatus will be described. For example, if the operation section 13 of the remote commander 11 of FIG. 1 is manually operated to instruct reproduction of a video disk to the LDP 1, then an infrared ray signal to instruct reproduction of a video disk is outputted from the light emission section 12. The infrared ray slight received by the light reception section 2 of the LDP 1. In response to the input of the signal, the LDP 1 starts reproduction of the video disk built therein.

A video signal reproduced from the video disk built in the LDP 1 is inputted to the video signal processing circuit 72 of FIG. 2 by way of the external input terminal 71 of the decoder 41 and the AV signal line. The video signal processing circuit 72 processes the thus inputted video signal and outputs the thus processed signal by way of the external output terminal 73 to the monitor 61 so that it is displayed on the monitor 61.

Meanwhile, the data slicer 81 separates character codes included in the 21st horizontal scanning line of the video signal supplied thereto from the external input terminal 71 and outputs the thus separated character codes to the CPU 83. The CPU 83 generates data corresponding to the character codes and outputs the data to the screen display circuit 84. The screen display circuit 84 generates character signals corresponding to the data thus inputted thereto and successively stores them into the memory 85. Then, after all character signals to be displayed are stored into the memory 85, the character signals are read out and outputted to the video signal processing circuit 72. The video signal processing circuit 72 superposes the character signals with an image signal and outputs the resulted signal to the monitor 61 by way of the external output terminal 73 so as to be displayed on the monitor 61.

Figure 4:
FIG. 4 is a schematic view showing an example of a display of a monitor shown in FIG. 1 in a bottom mode.

FIG. 4 illustrates an example of a display of the monitor 61 in such a case as described above. The display condition of FIG. 4 shows a display condition when a bottom mode is instructed by manually operating the position button 57 of the remote commander 51. In particular, in the condition shown, the English characters "Bye! See you!" are displayed at a lower portion of the screen such that Japanese characters are hidden behind them.

If the position button 57 is manually operated in this condition, then the manual operation is detected by the key matrix 94, and a corresponding detection signal is inputted to the CPU 91. Consequently, the CPU 91 controls the light emission section 52 so that an infrared ray signal corresponding to the manual operation of the position button 57 is outputted from the light emission section 52. The infrared ray signal is received by the light reception section 42 of the decoder 41, and a corresponding detection signal is inputted to the CPU 83.

Figure 5:
FIG. 5 is a similar view but showing an example of a display of the monitor shown in FIG. 1 in a top mode.

The CPU 83 changes over, when it receives the signal corresponding to the manual operation of the position button 57 in a bottom mode condition, its mode from the bottom mode to a top mode. Then, the CPU 83 controls the screen display circuit 84 so that the English characters "Bye! See you!" are displayed at an upper portion of the screen as seen in FIG. 5. Further, the Japanese characters "じゃあ／またね／" are displayed at a lower portion of the screen under the control of the CPU 83.

Figure 6:
FIG. 6 is a similar view but showing an example of a display of the monitor shown in FIG. 1 in a normal mode.

If the position button 57 is manually operated further in the top mode, then a signal corresponding to the manual operation is supplied to the CPU 83 similarly as in the case described above. In this instance, the CPU 83 changes over its mode from the top mode to a normal mode. Then, the CPU 83 controls the screen display circuit 84 so that a display based on the normal mode may be provided. In this instance, the screen display circuit 84 causes both of the Japanese and English characters to be displayed as they are at positions designated by corresponding signals included in the video signal. Consequently, such an image, for example, as seen in FIG. 6 is displayed on the monitor 61.

On the other hand, if the button 53 for adjusting the brightness is turned on, then the manual operation is detected by the key matrix 94 and inputted to the CPU 91. When the signal is received as an input, the CPU 91 controls the light emission section 52 to supply a signal corresponding to the manual operation to the CPU 83 by way of the light reception section 42. In this instance, the CPU 83 controls the screen display circuit 84 to increase the brightness of, for example, the English characters displayed as seen in any one of FIGS. 4 to 6 by one step.

This sequence of operations is performed each time the button 53 is manually operated. Consequently, the brightness of the characters increases by a number of steps equal to the number of manual operations.

On the contrary, if the button 54 is manually operated, then the brightness of the characters is controlled to be decreased in accordance with the number of manual operations.

On the other hand, if the display button 56 is manually operated, then the manual operation is detected by the key matrix 94 and inputted to the CPU 91. In response to the detection signal, the CPU 91 controls the light emission section 52 so that a signal corresponding to the detection signal is supplied to the CPU 83 by way of the light reception section 42. The CPU 83 controls, when the signal corresponding to the manual operation of the display button 56 is received as an input thereto, the screen display circuit 84 to stop the display of the character, when the monitor 6 is in a condition wherein it displays characters thereon as seen, for example, in any one of FIGS. 4 to 6. Consequently, such an image as seen, for example, in FIG. 7 is displayed on the monitor 61.

Figure 7:
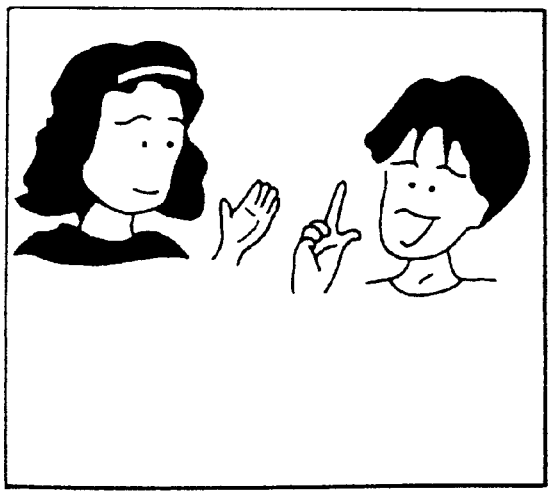
FIG. 7 is a similar view but showing an example of a display of the monitor shown in FIG. 1 when characters are erased.

In contrast, if the display button 56 is manually operated in a condition wherein no character is displayed on the monitor 61 as seen in FIG. 7, then characters are displayed as seen in any one of FIGS. 4 to 6.

Subsequently, operation of the character display control apparatus when the caption pause button 55 of the remote commander 51 is manually operated will be described with reference to the flow chart of FIG. 8. When the pause button 55 is manually operated, the manual operation is detected by the key matrix 94, and a corresponding detection signal is inputted from the key matrix 95 to the CPU 91. The CPU 91 controls, when the detection signal is received as an input thereto, the light emission section 52 to output an infrared ray signal. The infrared ray signal corresponding to the detection signal is received by the CPU 83 by way of the light reception section 42. When the signal corresponding to the manual operation of the pause button 55 is received as an input, the CPU 83 first discriminates at step 31 whether or not the decoder 41 is in a caption pause condition. This discrimination is based on discrimination whether or not a flag F is 1.

In particular, as hereinafter described, when the decoder 41 is in a caption pause condition, the flag F has been set to 1 at step S5, but when the decoder 41 is not in a caption pause condition, the flag F has been set to 0 at step S8.

Consequently, whether or not the decoder 41 is in a caption pause condition now can be discriminated from whether or not the value of the flag F is 1.

Now, if the decoder 41 is not in a pause condition (flag F is equal to 0), then the control sequence advances to step 2, at which it is discriminated whether or not a character signal (caption data) to be displayed on the monitor 61 is stored in the memory 85. If a character signal to be displayed on the monitor 61 is not stored, the decoder 41 waits until a character signal is stored. Then, after a character signal to be displayed on the monitor 61 is stored into the memory 85, the control sequence advances to step S3, at which the character signal stored in the memory 85 is read out and outputted to the video signal processing circuit 72. The character signal is then outputted to the monitor 61 by way of the external output terminal 73 so that it is displayed on the monitor 61.

Then, the control sequence advances to step S4, at which the CPU 83 controls the screen display circuit 84 to stop a generation operation (decoding operation) of new characters. In other words, the CPU 83 stops writing a new character signal into the memory 85. Consequently, the characters displayed on the monitor 61 are put into a pause condition.

In this instance, however, the LDP 1 is not in a pause condition and successively outputs a video signal of different frames. This video signal is supplied by way of the external input terminal 71 to and demodulated by the video signal processing circuit 72 and is then outputted by way of the external output terminal 73 to and displayed on the monitor 61. As a result, while the character display is put into a pause condition, the image display is not put into a pause condition.

Thereafter, the control sequence advances to step S5, at which the flag F is set to 1 since the decoder 41 has just been put into a caption pause condition.

On the other hand, if it is discriminated at step S1 that the decoder 41 is in a caption pause condition (when it is discriminated that the flag F is 1), the control sequence advances to step S6, at which the CPU 83 controls the screen display circuit 84 to end reading out of the character signals stored in the memory 85. Consequently, the characters having been displayed on the monitor 61 are erased. Then, the control sequence advances to step S7, at which next decoding processing is started. In particular, the CPU 83 controls the screen display circuit 84 to store character signals corresponding to data to be inputted subsequently into the memory 85 and then read out, at the timing at which a display on signal (which is similarly superposed on the 21st horizontal scanning line) is inputted, the character signals. The character signals thus read out are outputted to and displayed on the monitor 61. Consequently, the caption mode condition is canceled, and therefore, the flag F is set to 0 at the next step S8.

The operations described above will further be described with reference to FIGS. 9 to 13. It is assumed that the screen based on a video signal reproduced by and outputted from the LDP 1 is such as shown in FIGS. 9 to 12.

Figure 9:
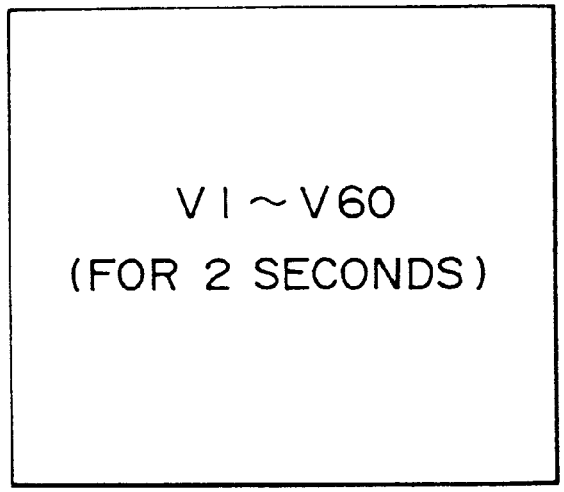
FIGS. 9 to 12 are schematic views of respective display screens illustrating processing illustrated in the flow chart of FIG. 8.

In particular, it is assumed that only an image is displayed but no character is displayed at 60 frames V1 to V60 (for 2 seconds) as seen in FIG. 9.

Figure 10:
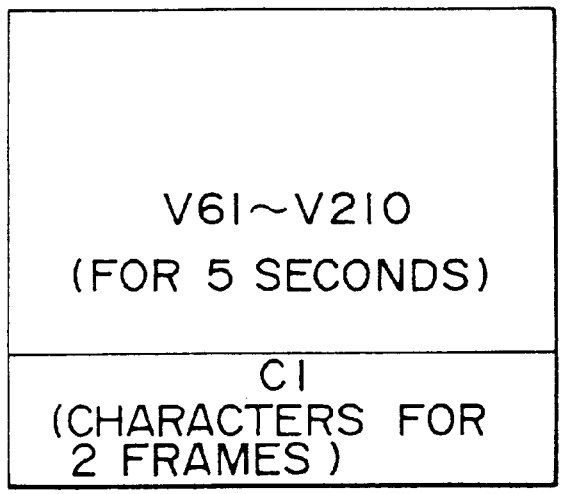

In contrast, a character C1 is displayed together with an image at next 150 frames V61 to V210 (for 5 seconds) as seen in FIG. 10. The character C1 is formed from characters for 2 frames.

Figure 11:
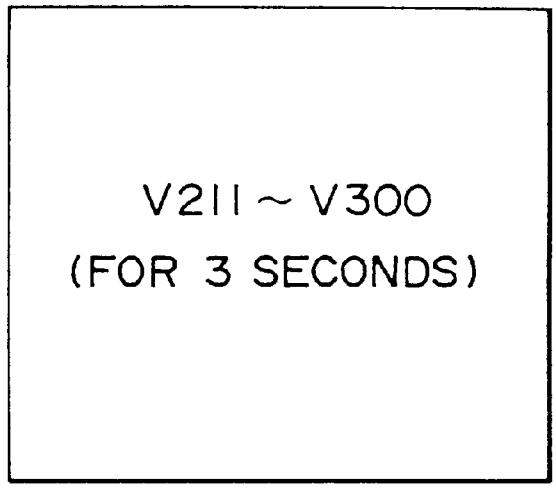

Further, at the next 90 frames V211 to V300 (for 3 seconds), only an image is displayed while no character is displayed as seen in FIG. 11.

Figure 12:
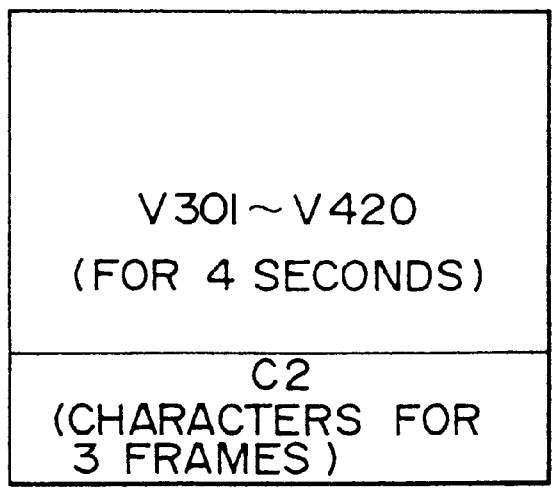

Then, at the next 120 frames V301 to V420 (for 4 seconds), another character C2 is displayed together with an image as seen in FIG. 12. The character C2 is formed from characters for three frames.

Figure 13:
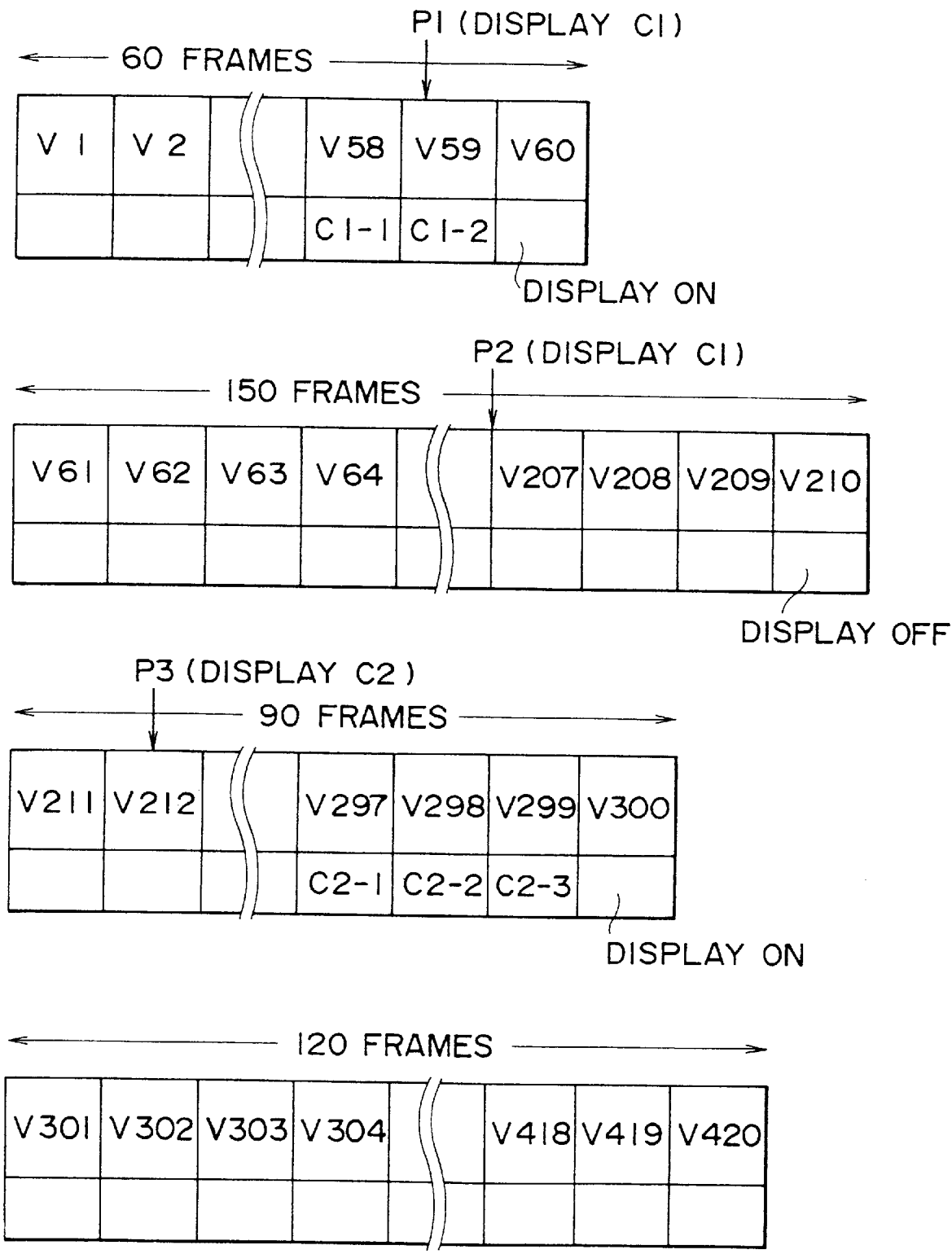
FIG. 13 is a diagrammatic view illustrating video signals for the displays illustrated in FIGS. 9 to 12.
Figure 14:
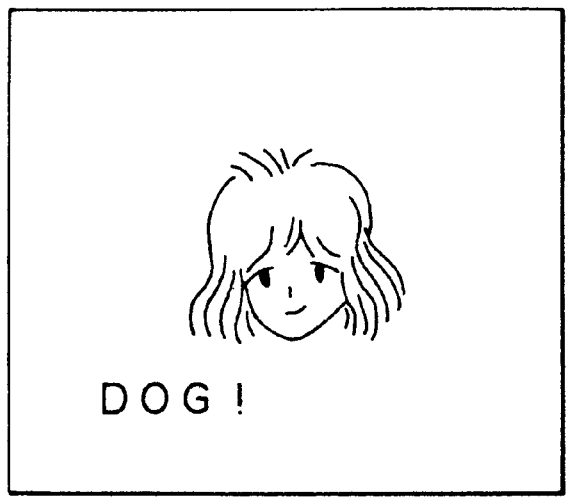
FIGS. 14 and 15 are schematic views showing different examples of a display by a conventional display control apparatus.
Figure 15:
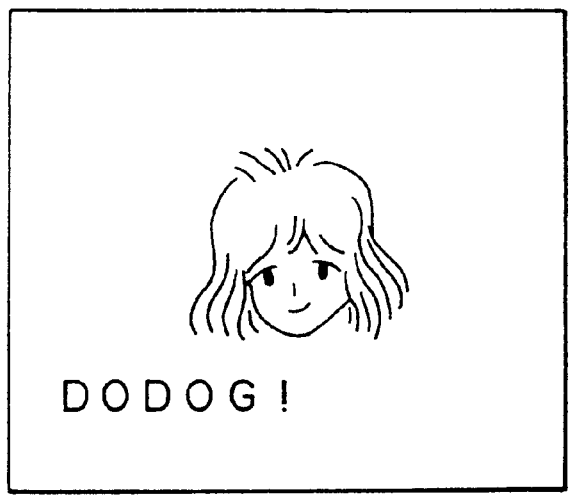

When an image and/or a character are displayed as seen in FIGS. 9 to 12, a video signal reproduced by and outputted from the LDP 1 is constructed as seen in FIG. 13. In particular, character data C1-1 and C1-2 corresponding to the character C1 are disposed on the 21st horizontal scanning lines of the two frames V58 and V59 from among the 60 frames V1 to V60, respectively. Then, a display ON signal is inserted in the 21st horizontal scanning line of the next frame V60.

Accordingly, if the display ON signal included in the frame V60 is detected after character signals corresponding to the character data C1-1 and C1-2 inserted in the two frames V58 and V59 are stored into the memory 85, then the CPU 83 reads out the character signals corresponding to the character data C1 (C1-1 and C1-2) stored in the memory 85 at the following frames V61, . . . Then, the CPU 83 outputs the thus read out character signals to the monitor 61 so that they are displayed on the monitor 61. This condition is continued until a display OFF signal is detected from the 21st horizontal scanning line of the frame V210. As a result, such an image as seen in FIG. 10 is displayed at the 150 frames V61 to V210 (for 5 seconds).

At the next 90 frames V211 to V300 (for 3 seconds), only an image of the frames 211 to 300 is displayed as seen in FIG. 11. However, since the data C2-1 to C2-3 corresponding to the character data C2 are superposed in the three frames V297 to V299, when the display ON signal at the frame V300 is detected after the character signals corresponding to the character data are stored into the memory 85, the CPU 83 reads out the character signals corresponding to the character data C2 (C2-1 to C2-3) stored in the memory 85. The CPU 83 outputs the thus read out character signals to the monitor 61 so that they may be displayed on the monitor 61. As a result, the image and the character C2 of the frames V301 to V420 are displayed for 4 seconds as seen in FIG. 12.

Then, if, for example, the caption pause button 55 is manually operated to instruct a caption pause at the timing indicated by P1 in FIG. 13, then at this timing, the character signals of the character data C1 are being written into the memory 85. Consequently, it is discriminated at step S2 of FIG. 8 that a character signal to be displayed on the monitor 61 is not present in the memory 85 as yet. Then, when all of the character signals of the character data C1 are written into the memory 85, it is discriminated that character data are present. Thus, the control sequence advances to step S3, at which the character is displayed and a caption pause condition is entered. In particular, in this instance, in a condition wherein the character C1 is displayed on the monitor 61, a caption pause condition is entered.

Further, it is assumed that, at the timing indicated by P2 in FIG. 13, a caption pause is instructed. In this instance, the character signals of the character data C1 are stored into and read out from the memory 85 and are displayed on the monitor 61. Accordingly, in this instance, it is discriminated at step S2 that character data are present, and then, at step S3, the character is displayed as it is. Further at step S4, a caption pause condition is set. Accordingly, also in this instance, a caption pause condition is entered in a condition wherein the character C1 is displayed on the monitor 61.

Meanwhile, it is assumed that a caption pause is instructed at the timing indicated by P3 in FIG. 13. In this instance, the character signals of the character data C1 which have been displayed within the period of the 150 frames V61 to V210 (for 5 seconds) are stored in the memory 85. However, the display has been completed already, and now, the monitor 61 displays no character thereon. Consequently, in this instance, it is discriminated at step S2 of FIG. 8 that character data to be displayed on the monitor 61 are not present in the memory 85 as yet. Then, after the character data C2 of the character to be displayed for four seconds at the 120 frames V301 to V420 are extracted at the frames V297 to 299 and stored into the memory 85, the control sequence advances from step S2 to step S3, at which the character C2 is outputted to and displayed on the monitor 61. Then at step S4, a caption pause condition is set.

Figure 8:
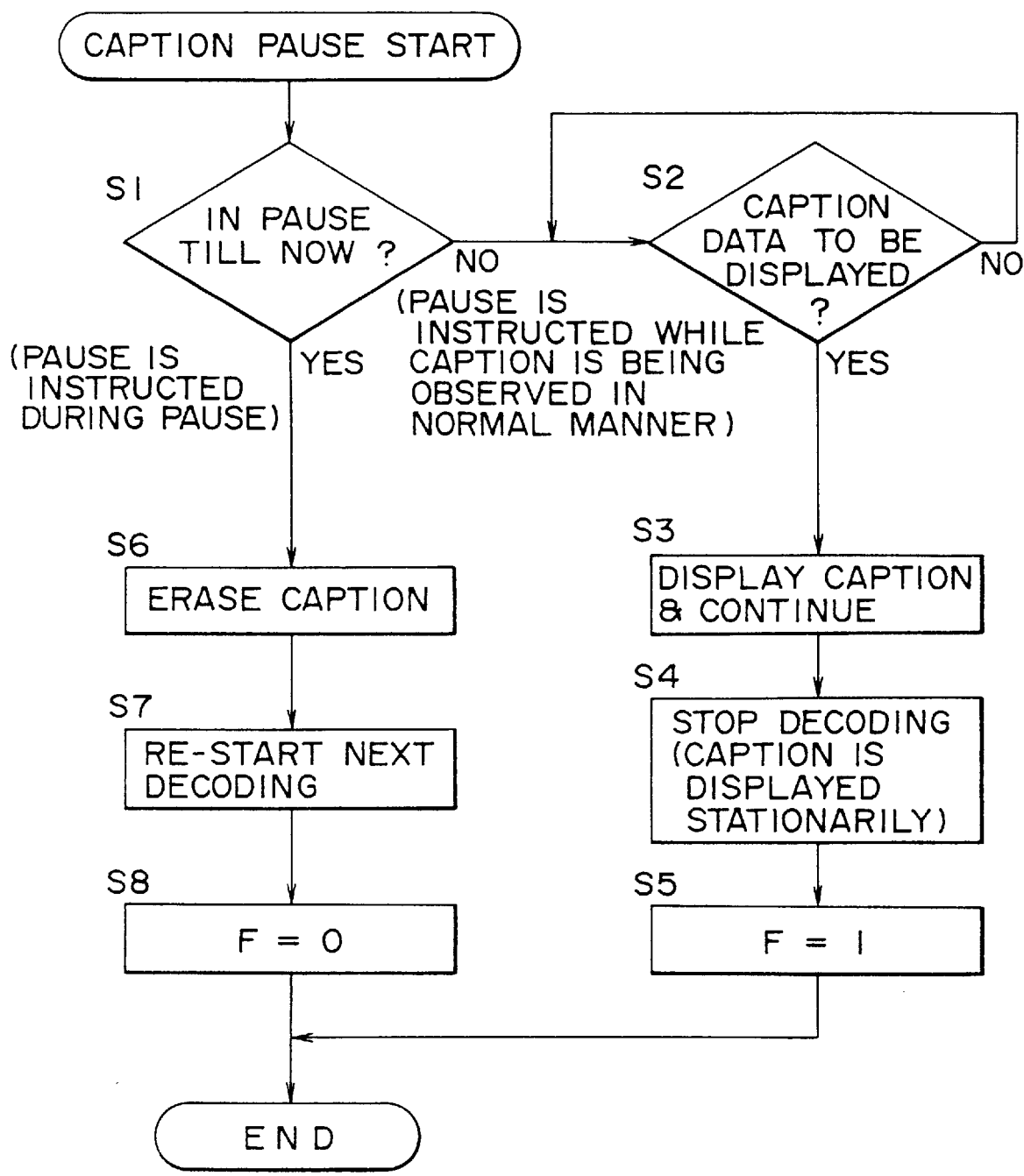
FIG. 8 is a flow chart illustrating operation of the character display control apparatus of FIG. 1.

In the processing illustrated in the flow chart of FIG. 8, when it is discriminated at step S1 that the decoder 41 is not in a caption pause condition, a caption pause condition is not set immediately, but set at step S4 after the decoder 41 waits until it is discriminated at step S2 that character data to be displayed on the monitor 61 are present and then the character is displayed at step S3. However, it is otherwise possible to set a caption pause condition immediately without waiting until it is discriminated that character data to be displayed subsequently are present.

However, if a caption pause condition is set in this manner, then a caption pause condition is set in a condition wherein characters are not displayed. Accordingly, in this instance, no character will thereafter be displayed until the caption pause condition is canceled. As a result, if the user manpally operates the caption pause button 55 in error, then a condition wherein no character is displayed at all continues for a long time, and the user may possibly take in error that the apparatus has failed.

In contrast, if a caption pause condition is set normally in a condition wherein characters are displayed as in the embodiment described above, then since only an image varies while characters do not vary, it can be recognized readily that a pause condition of a display of characters has been set. Accordingly, the possibility that it may be mistaken that the apparatus has failed is reduced.

It is to be noted that, if the operation section 13 of the remote commander 11 is manually operated to instruct a pause of the LDP 1, then since the LDP 1 is put into a pause condition, a video signal of a same frame is repetitively supplied from the LDP 1 to the decoder 41. As a result, the video signal processing circuit 72 causes the monitor 61 to normally display a same image. Further, if this is a condition immediately after a display on signal is inputted, then the screen display circuit 84 reads out the characters stored in the memory 85 as they are and causes the monitor 61 to display them. Accordingly, in this instance, both of the image and the characters are displayed in a pause condition.

On the other hand, if a pause condition is entered after a display off signal is detected, the screen display circuit 84 does not perform reading out of the character data from the memory 85. Accordingly, in this instance, no character is displayed on the monitor 61, but only an image (still picture) is displayed.

It is to be noted that, while the foregoing description relates to a case wherein a reproduction signal from the LDP 1 is demodulated and displayed, similar processing is executed also when a reproduction output of the VTR 21 is demodulated and displayed.

Or, the present invention can be applied not only to decoding and displaying of a reproduction signal from a recording medium, but also to a case wherein a signal received and demodulated on the real time basis from and by a tuner not shown is inputted to and decoded by the decoder 41 and then outputted to and displayed on the monitor 61.

Having now fully described the invention, it will be apparent to one of ordinary skill in the art that many changes and modifications can be made thereto without departing from the spirit and scope of the invention as set forth herein.

What is claimed is:

1. A character display control apparatus for controlling a displaying condition of a character on a display in a superposed relationship with an image, comprising:

separation means receiving a video signal for separating character data included in the video signal input thereto;

generation means for generating a character signal corresponding to the character data separated by said separation means;

superposition means for superposing the character signal from said generation means with an image signal also included in the video signal;

manually operable means for being manually operated by a user for placing a display of the character signal on the display into a pause condition without placing a display of the image signal on the display into a pause condition; and control means operable in response to a manual operation of said manually operable means by the user for controlling said generation means for placing the display of the character signal on the display into a pause condition without erroneously repeating a character signal.

2. A character display control apparatus according to claim 1, wherein when said manually operable means is manually operated in a condition wherein a character is displayed, said control means places the character display into a pause condition and when said manually operable means is manually operated in a condition wherein no character is displayed, said control means causes the character display to display a character at a next timing interval and then places the character display into a pause condition.

3. A character display control apparatus according to claim 1 or 2, wherein when said manually operable means is manually operated in a pause condition of a display said control means cancels the pause condition.

4. A character display control apparatus, comprising:

means for supplying a video signal including an image signal, an audio signal and character data;

a decoder receiving the video signal for separating the character data from the video signal, generating a character signal corresponding to the thus separated character data, and superposing the character signal and the image signal;

means for displaying the thus superposed character signal and image signal; and manually operable means operable by a user of the apparatus for putting only the display of the character signal into a pause condition without erroneously repeating a display of the character signal.

5. A character display control apparatus according to claim 4, wherein the character data are inserted in a vertical fly-back period of the video signal.

6. A character display control apparatus according to claim 5, wherein the character data correspond to the audio signal.

7. A character display control apparatus according to claim 4, wherein said manually operable apparatus is a remote commander.

* * * * *